United States Patent [19]
Trapani

[11] 3,850,718
[45] Nov. 26, 1974

[54] METAL PATCHING PLATE AND METHOD OF APPLYING THE SAME TO DAMAGED SURFACES

[76] Inventor: Simon J. Trapani, 1921 Hillside Dr., Burlingame, Calif. 94010

[22] Filed: Feb. 20, 1973

[21] Appl. No.: 334,064

Related U.S. Application Data
[63] Continuation-in-part of Ser. No. 159,658, July 6, 1971, abandoned.

[52] U.S. Cl.................. 156/94, 161/160, 161/190, 161/406
[51] Int. Cl............................................ B32b 35/00
[58] Field of Search ...... 156/94, 344; 161/160, 190, 161/406; 134/40

[56] References Cited
UNITED STATES PATENTS
2,504,509  4/1950  Erickson............................... 156/94
3,236,007  2/1966  Abeson............................... 161/190 X
3,311,338  3/1967  Culley................................ 161/161 X Primary Examiner—Edward G. Whitby

[57] ABSTRACT

A metal patching plate backed with a thin layer of high density foam which is double coated with pressure sensitive adhesive, one adhesive layer serving to bond the foam layer to the plate, while the other is covered with a protective liner. This patching plate is applied over a damaged area in a metal or other surface by first cleaning and otherwise preparing the latter and then stripping away the protective liner from the patching plate and applying the freshly exposed adhesive-bearing surface of the foam layer over the damaged area. The resulting path is essentially permanent and permits the item of equipment being repaired to remain in service indefinitely.

5 Claims, 8 Drawing Figures

METAL PATCHING PLATE AND METHOD OF APPLYING THE SAME TO DAMAGED SURFACES

RELATED APPLICATION

This application is a continuation in part of application Ser. No. 159,658, filed July 6, 1971, now abandoned.

BACKGROUND OF INVENTION

This invention finds particular application in connection with the repair of damaged truck trailers and seagoing cargo containers. The walls of these cargo handling items frequently become broken open with even minor accidents or occasional rough handling, with the result that water can get inside and damage any cargo which is enclosed. For example, the aluminum side panels of typical truck trailers are quite soft and are easily slit or otherwise ruptured as the trailer is being maneuvered in close quarters. Many of the resulting damaged areas are quite small, being confined to one or two square feet, while others may involve a long rip which runs for several feet.

It is an object of this invention to provide a patching plate, of any desired size or configuration, which can readily be applied over these damaged areas once the latter have been cleaned and smoothed down so that no protruding edge will prevent the patch plate from being smoothly set into place over the area enclosing the damage. A further object is to provide a patching plate of this character which will provide a tight seal with the damaged, underlying surface area and is capable of lasting for long periods of time, it being removed only with great difficulty.

SUMMARY OF THE INVENTION

It has been found that the foregoing and other objects of the invention are achieved by a metal patching plate, usually fabricated of aluminum or thin gauge steel, which is backed with a layer of high density foam which is double coated (i.e., coated on each of its two principal surfaces) with a pressure sensitive adhesive layer. One of these adhesive layers serves to bond the foam layer to the back of the patching plate. The other adhesive layer is protected with a liner which is stripped away just before the patch is to be applied to a damaged surface, the adhesive layer so exposed serving to bind the foam layer, and with it the attached metal plate, to the damaged surface.

As stated above, the metal of the patching plate is preferably aluminum (or an alloy thereof) or steel, through any other metal could be employed. For example, when patching copper articles the plate might well be fabricated of this same metal. The gauge of the metal is not critical, though, of course, the metal should be sufficiently heavy as to resist bending or other undesired deformation in the particular service which is contemplated. For example, one may employ, for the plate, aluminum alloys varying from 1,100 through 5-52, tempers ranging from 0 through H19, and thickness from 0.006 inch through 0.065 inch. Steel sheeting may be used ranging from about 28 up to 9 gauge in thickness. All sheeting may, of course, be of any desired width and length inasmuch as the foams layers employed to back the patching plate are also available in many sizes and can be pieced together from several different foam pieces, if desired.

As the backing layer for the patching plate there may be used any one of a variety of high density foam materials which have good strength (i.e., which do not tear readily when an attempt is made to pull the patching plate away from the surface to which it may have been applied), as well as the ability to accept and hold the applied layers of the pressure sensitive adhesive. Preferred materials for the foam layer in the present invention are the double coated, pressure sensitive tapes (numbers 4004, 4008, 4016 and 4032), wherein the foam is made of polyurethane, which are marketed by 3M Company of St. Paul, Minnesota. These tapes, wherein the last two numbers represent the thickness, i.e., the 4004 tape is ¼ inch thick, while the 4032 tape is 1/32 inch thick, come in varying widths up to 12 or more inches. They come in a roll, with one side protected with a wax-coated paper which serves as a protective liner. The other side, with its applied adhesive layer, becomes exposed as the tape is unwound from the roll and is thus ready, when cut to size, for tight bonding to the back of the patching plate. The polyurethane foam in these tapes is of the high density type.

With a patching plate of the proper size and metal makeup having been selected, all that remains when preparing to patch a damaged metal surface such as that of an aluminum side panel in a truck trailer, for example, is to carefully clean the area to be covered with solvents, or the like, to get rid of all dirt and grease which may be present. Further, any edges of the damaged portion which extend outwardly of the plane of the panel should be removed or pressed inwardly out of the way, thereby permitting the patching plate to lie flat when it is pressed into place over the damaged surface. When the surface preparation of the damaged panel is made in a proper fashion, and the patching plate (as formed using a 3M tape as recited above) has been layed down and adhered to the cleaned, damaged surface, it proves almost impossible for one to manually tear the applied plate away from its substrate. In normal useage, the plate will remain properly affixed for long periods of time, and will keep out all moisture and dirt from entering the hole covered by the plate, while also looking tidy.

DESCRIPTION OF THE PREFERRED EMBODIMENTS

The present invention is illustrated as to a particular preferred embodiment thereof in the accompanying drawing wherein.

Figure 2:
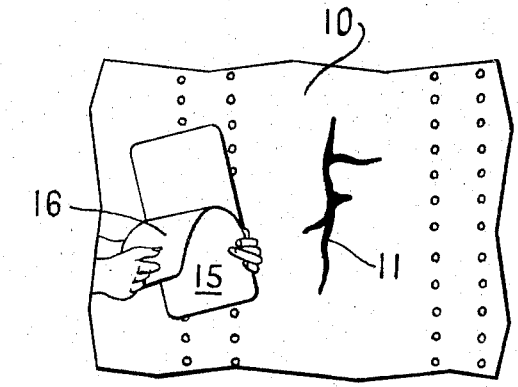
FIG. 2 shows a patching plate of the present invention with its protective liner being stripped away to expose a pressure sensitive adhesive layer which faces the viewer.
Figure 4:
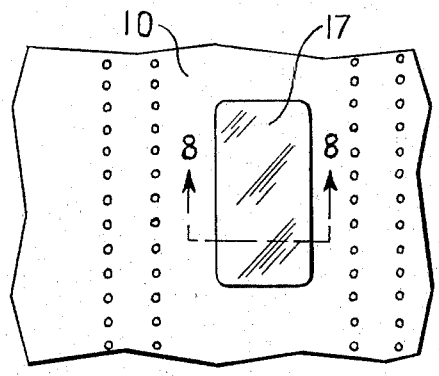
FIG. 4 is a view similar to that of FIG. 3, but with the patching place now anchored to the damaged panel and covering the torn areas thereof.
Figure 5:
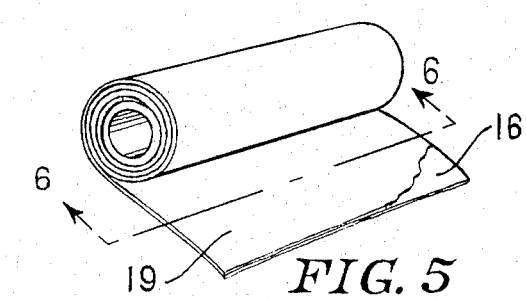
Figure 6:
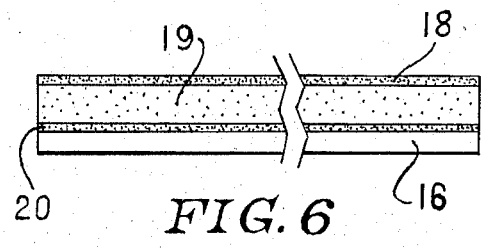
Figure 7:
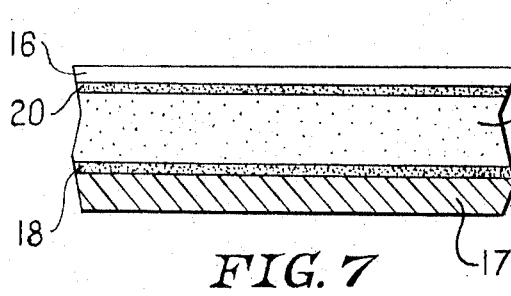
Figure 8:
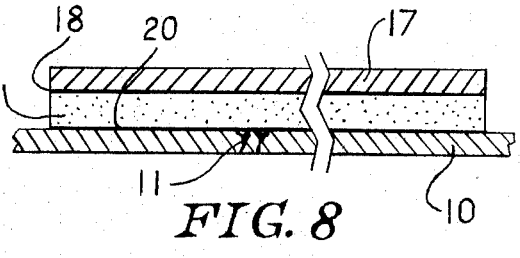

FIG. 5 is a view in perspective showing a roll of doubled coated, high density polyurethane foam tape, as marketed by the 3M Company, the top surface of the unwound tape, as viewed in the figure, being a pressure sensitive layer which is affixed to one side of the plate element to form the patching plate hereof, while the lower side of the unwould tape is covered with a wax-coated protective liner;

FIG. 6 is a sectional view taken along the plane indicated by the line 6—6 in FIG. 5, the elements of the tape, including the adhesive layers, being shown on an enlarged and exaggerated scale;

FIG. 7 is a sectional view, to an enlarged scale, of the patching plate of the present invention, as held in the hand of the operator in FIG. 2, and with the protective liner in place over the pressure sensitive adhesive layer; and FIG. 8 is a sectional view, to an enlarged scale, taken along the plane indicated by the line 8—8 in FIG. 4, and showing the integral structure formed by applying the patching plate over the damaged panel.

Figure 1:
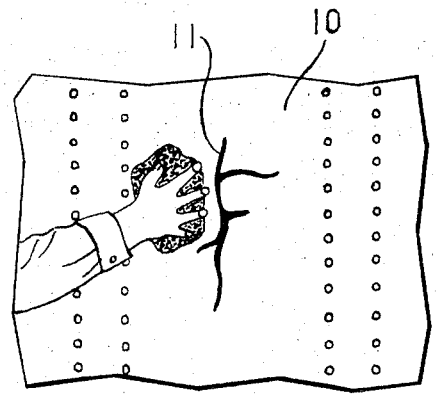
FIG. 1 is a view of a damaged side panel of a truck trailer, with an operator cleaning the adjacent portions of the panel preparatory to applying a patch over the damaged area.
Figure 3:
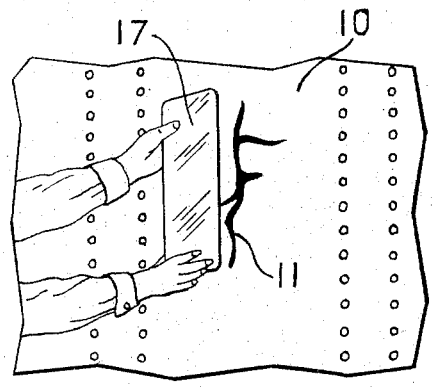
FIG. 3 is a view similar to that of FIG. 2, but with the patching plate being turned over to bring the adhesive side over the damaged area of the panel under repair.

Referring now to FIGS. 1 through 4 of the drawing, there are shown progressive views of the method employed in repairing an aluminum side panel 10 of a truck trailer which has been given a jagged cut, as shown at 11. The operator first cleans the panel, as shown in FIG. 1, to free the surfaces of dirt and grease, then, in FIG. 2, strips from patching plate 15 its paper liner 16, and finally turns the plate over and presses it against the damaged areas of the panel to provide the finished patch as shown in FIGS. 3 and 4.

The patching plate indicated generally at 15 is fabricated by applying the tape shown in FIG. 5 to one surface of the plate element of the patch, which element is indicated at 17. The components of the patch 15 are best seen in FIG. 7, the metal plate 17 being attached to the foam layer 19 of the tape by a pressure sensitive adhesive layer 18. The other side of the foam layer 19 carries an adhesive layer 20 which also is of the pressure sensitive type, this layer 20 being protected by a waxed paper liner 16 which is readily stripped away when the patch is to be applied to a damaged surface. These several layers comprising the patching plate 15 are shown, for purposes of illustration, as having an exaggerated thickness in the several views. Actually, the adhesive layers are essentially integral with the foam and contained therein.

FIG. 8 shows the structure of the panel 10 of the truck trailer after the patching plate 15 has been applied. Thus, the damaged panel member 10 is secured by the adhesive layer 20 to the foam layer 19 which, in turn, is secured by the adhesive layer 18 to the metal element 17 of the patching plate. This structure is a unitary one characterized by a very strong bond between the metal members 10 and 17.

While the present invention has particular utility in connection with the repair of damaged truck trailers and seagoing cargo containers, it is not limited to such useages. Thus, the metal patching plate can be used to cover or seal holes in such things as wood, plastic, glass and many other materials which are capable of being readily bonded to the pressure sensitive side of the patching plate as the protective liner is removed. It will be appreciated that the present invention is not to be limited by the terms of description or details of illustrations as various modifications and alterations hereof may be made within the scope of this invention.

I claim:

1. A patching structure adapted to patch a damaged panel member, said structure comprising a metal plate having a gauge such as to resist deformation in normal usage and being backed with a layer of high density foam, said foam being coated on each of its two principal sides with a pressure sensitive adhesive layer, one of said adhesive layers serving to bond the foam to the back of the plate and the other adhesive layer being covered with a protective liner capable of being readily stripped away from the structure.

2. The structure of claim 1 wherein the plate is fabricated of aluminum and the foam is made up of a polyurethane material having a thickness of from about 1/32 to ¼ inch.

3. A patched structure incorporating a damaged panel, a patching plate overlying the area of damage in the panel, and a layer of high density foam interposed between the damaged panel and the patching plate, said foam being adhered to the panel and the plate by a pressure sensitive adhesive.

4. A method of repairing a damaged panel which comprises freeing the areas adjacent to the damage in said panel of dirt and grease and applying over said areas the patching structure of claim 1 from which the protective liner has been stripped away, the adhesive layer exposed by removing said liner being pressed into tight engagement with the cleaned panel to cover the area of damage therein.

5. The method of claim 4 wherein the damaged panel is comprised of steel or aluminum and the patching structure is comprised of aluminum backed with a thin layer of high density polyurethane foam.

* * * * *